Patented July 14, 1942

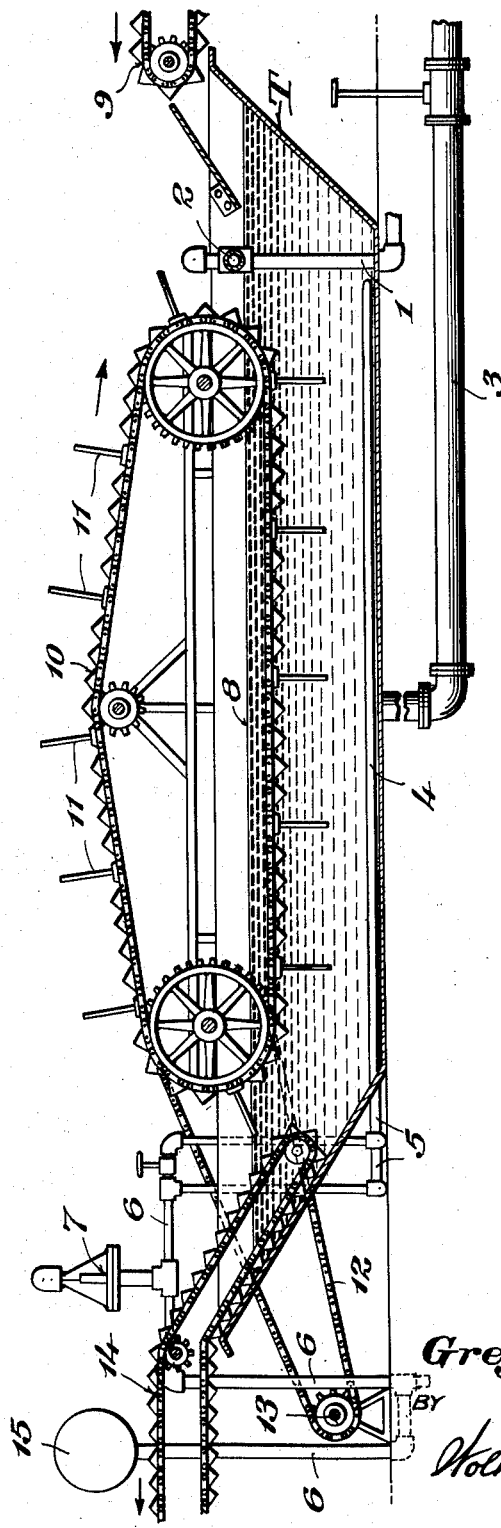

2,289,851

UNITED STATES PATENT OFFICE 2,289,851

PROCESS FOR DEOILING CITRUS FRUIT SKINS

Gregg Maxcy, Sebring, Fla.

Application November 29, 1940, Serial No. 367,863

5 Claims. (Cl. 146—219)

This invention relates to a new process for de-oiling the skins of citrus fruit preliminary to juicing and/or canning operations.

The juices of citrus fruit, particularly of oranges and grapefruit are now extensively marketed, in commercial containers and also the fruit meat itself is likewise extensively marketed in suitable containers, usually cans, and in connection therewith a valuable industry has been built up, both in citrus juice extracting plants and in citrus canning plants, thereby requiring the employment of methods which are highly sanitary and methods which prevent contamination of the juices or canned fruit meat with undesirable and/or unpleasant taste.

Accordingly, it is primarily the object of the present invention to so treat the unpeeled citrus fruit, for instance, oranges, as an example, as to remove from the skin thereof the citrus peel-oil which is a source of undesirable and unpleasant contamination of the juices of the fruit when the same is used in juicing and/or canning operations. Furthermore, the presence of citrus peel-oil, known as orange oil, in oranges, which is contained in the surface chloroplast cells, seriously affects the keeping quality of the canned product, whether juice or the meat of the fruit, and it is therefore of practical importance to preliminarily effect a complete removal of this oil of the said cells of the unpeeled fruit skins prior to subjecting the same to the action of the plant machinery in the juicing and/or canning operations.

In carrying forward the invention various expedients or different types of machinery may be employed for the purpose, but for illustrative purposes a practical machine that may be utilized is shown in the drawing, in which The figure of the drawing is a diagrammatic sectional view of a skin de-oiling machine for citrus fruit having the necessary equipment for feeding and delivering the fruit and maintaining a proper temperature and level for the active de-oiling solution.

Using the figure of the drawing as an illustration exemplifying the new process, the machine there illustrated includes a tank T containing the saline solution which is the active agent employed for effecting a breaking open of the surface cells containing the peel-oil and this tank is equipped with a suitable liquid inlet pipe 1 controlled by the valve 2 and a suitable drain pipe 3. For the purpose of maintaining the solution at a proper temperature within the tank suitable heating means may be employed, such for instance, as heating coils 4 arranged in the bottom of the tank and coupled with the piping 5—5, through which is circulated steam or equivalent heating element from the piping 6, with which is associated a suitable thermostat 7 and a recording thermometer 15, both of which instruments are diagrammatically indicated and form no part of the invention claimed herein.

In the illustration shown it will be observed that the level of the solution therein is indicated by the reference numeral 8 and the fruit to be de-oiled is fed into the solution at one end of the tank by means of a suitable feeding conveyor 9 and within the tank the fruit is picked up and propelled toward the opposite end thereof by the propelling conveyor 10 carrying spaced pusher-blades 11 operating beneath the level 8 of the solution within the tank. The said conveyor 10 is driven by any suitable power means, as by a driving belt from the drive shaft 13, and at the discharging end of the tank there is arranged a suitable delivery belt 14 which picks up the fruit as it leaves one end of the conveyor and discharges it from the machine ready for a suitable rinsing operation.

From the foregoing it will be understood that the unpeeled fruit is subjected, as a whole, to the action of a heated saline solution, and the best results have been obtained by utilizing a saline solution, that is, a solution of ordinary sodium chloride or common salt and used between 25 and 30 on the Beaumé scale up to a saturated solution, and it has also been found that the best results are obtained by maintaining the saline solution at a temperature ranging between 180° F. approximately up to the boiling point of 212° F., that is, short of the boiling point.

Whether the fruit is held submerged, while subject to the saline solution, or sprayed or otherwise covered with the saline solution, this step in the operation is continued for several minutes with the result that the thin skin covering of the chloroplast cells, containing the peel-oil are disintegrated or perforated by the action of the strong salt solution, thereby breaking open these cells and thus exposing and releasing the oil fluid. Then, the next step in the process is to subject the fruit thus treated to a rinse of fresh water, by submergence, spraying or otherwise, but preferably to the action of hot live steam so as to completely wash out the chloroplast cells and to completely remove the released oils from the skin so that the fruit is then in proper condition for being subjected to the machinery for the juicing and/or canning operations. The technical explanation of the foregoing action and steps of the process is that the hot brine solution, within the stated temperature range, has the effect of quickly breaking down or rupturing the thin skin membrane covering the chloroplast cells, thus exposing the oil contents of the cells to the brine solution into which solution are released the water-miscible ingredients of the oil while the water-insoluble ingredients of the oil are grained by the brine. This action of the brine solution makes it possible to completely remove all of the oil from the cells and the surface of the skin by the final cleansing step with fresh water, live steam, or otherwise. The period of several minutes above referred to is within the range of from five to ten minutes.

From the foregoing it is thought that the essentials of the process claimed will be understood without further description but it will also be understood that any practical changes or modifications in the process may be resorted to within the scope of the appended claims.

I claim:

1. A process for de-oiling citrus fruit skins which consists in subjecting the unpeeled fruit, as a whole, to the action of a heated solution of sodium chloride for a sufficient length of time to rupture the skin membrane covering of the chloroplast cells and to cause the graining of the oil therein, and subsequently subjecting the fruit to a skin and cell cleansing operation.

2. A process for de-oiling citrus fruit skins which consists in subjecting the unpeeled fruit, as a whole, to the action of a heated and approximately saturated solution of sodium chloride for a sufficient length of time to rupture the skin membrane covering of the chloroplast cells and to cause the graining of the oil therein, and subsequently subjecting the fruit to a skin and cell cleansing operation.

3. A process for de-oiling citrus fruit skins which consists in subjecting the unpeeled fruit, as a whole, to the action of a heated and approximately saturated solution of sodium chloride for a sufficient length of time to rupture the skin membrane covering of the chloroplast cells to expose the oil therein, and then subjecting the fruit to a wash of clear water.

4. A process for de-oiling citrus fruit skins which consists in subjecting the unpeeled fruit, as a whole, to the action of a heated and approximately saturated solution of sodium chloride for a sufficient length of time to rupture the skin membrane covering of the chloroplast cells to expose the oil therein, and then subjecting the fruit to the scavenging action of steam.

5. A process for de-oiling citrus fruit skins which consists in subjecting the unpeeled fruit, as a whole, to the action of a hot aqueous solution within a temperature range between 180° F. and 212° F. and containing a salt selected from the group of salts having the same physical and chemical action on citrus fruit skins, e. g., as sodium chloride for a sufficient length of time, to rupture the skin membrane covering of the chloroplast cells to expose and grain the oil therein, and finally subjecting the fruit to a skin and cell cleansing wash.

GREGG MAXCY.